March 21, 1950

H. M. SHERIDAN 2,501,293

CUTTING TOOL

Filed Jan. 23, 1946

2 Sheets-Sheet 1

INVENTOR.
Henry M Sheridan
BY
R. T. Sperry
ATTORNEY.

March 21, 1950 H. M. SHERIDAN 2,501,293
CUTTING TOOL

Filed Jan. 23, 1946 2 Sheets-Sheet 2

INVENTOR.
BY Henry M Sheridan
R. T. Sperry
ATTORNEY.

Patented Mar. 21, 1950

2,501,293

UNITED STATES PATENT OFFICE 2,501,293

CUTTING TOOL

Henry M. Sheridan, Erie, Pa., assignor to Apex Tool & Cutter Company, Shelton, Conn., a corporation of Connecticut Application January 23, 1946, Serial No. 642,923

4 Claims. (Cl. 29—96)

This invention relates to cutting tools for machine tools and is concerned with rotary cutting tools of the milling or boring bar type. More particularly the invention relates to cutting tools which are characterized by the provision of a plurality of replaceable cutting elements or tool bits which may be securely and adjustably positioned within a cutter body as in the case of a milling cutter and which may be removed and ground sharpened and adjusted to compensate for wear.

While the inventive concept is broadly applicable to many instruments, it is primarily designed for and here illustrated as, a milling cutter of the face milling type in which the individual bits are mounted to extend radially from a circular body with their cutting edges protruding from the front side face of the body. Such bits are usually formed with a welded, carbide, or like alloy, cutting tip with which the present invention is not concerned.

The present invention is concerned with the securement of the bits in the cutter body so that a novel and improved rigidity of combination is achieved. The present application is specifically concerned with the application of such means to hold such a multiple bit tool of the milling and particularly face milling type tool.

In general terms the primary object is to provide a multiple bit tool assembly wherein the bits are retained with a maximum of rigidity whereby the combination approaches the characteristics of an integral structure.

More specifically the invention seeks to provide an assembly in which retaining forces and cutting forces each react to deliver a thrust back into the mass of the holder body so as to minimize the danger of loosening or breakage thus to insure the achievement of the general object above enumerated.

Figure 1:
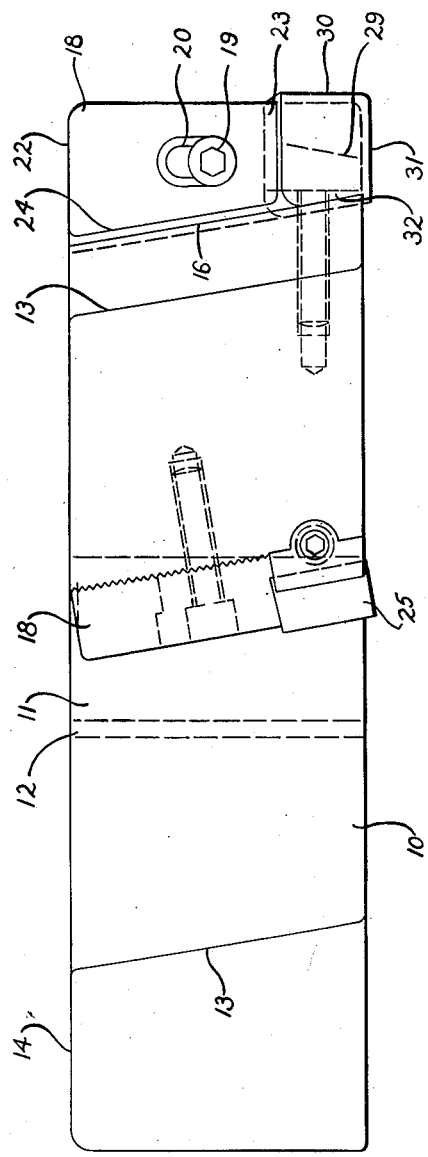
Figure 2:
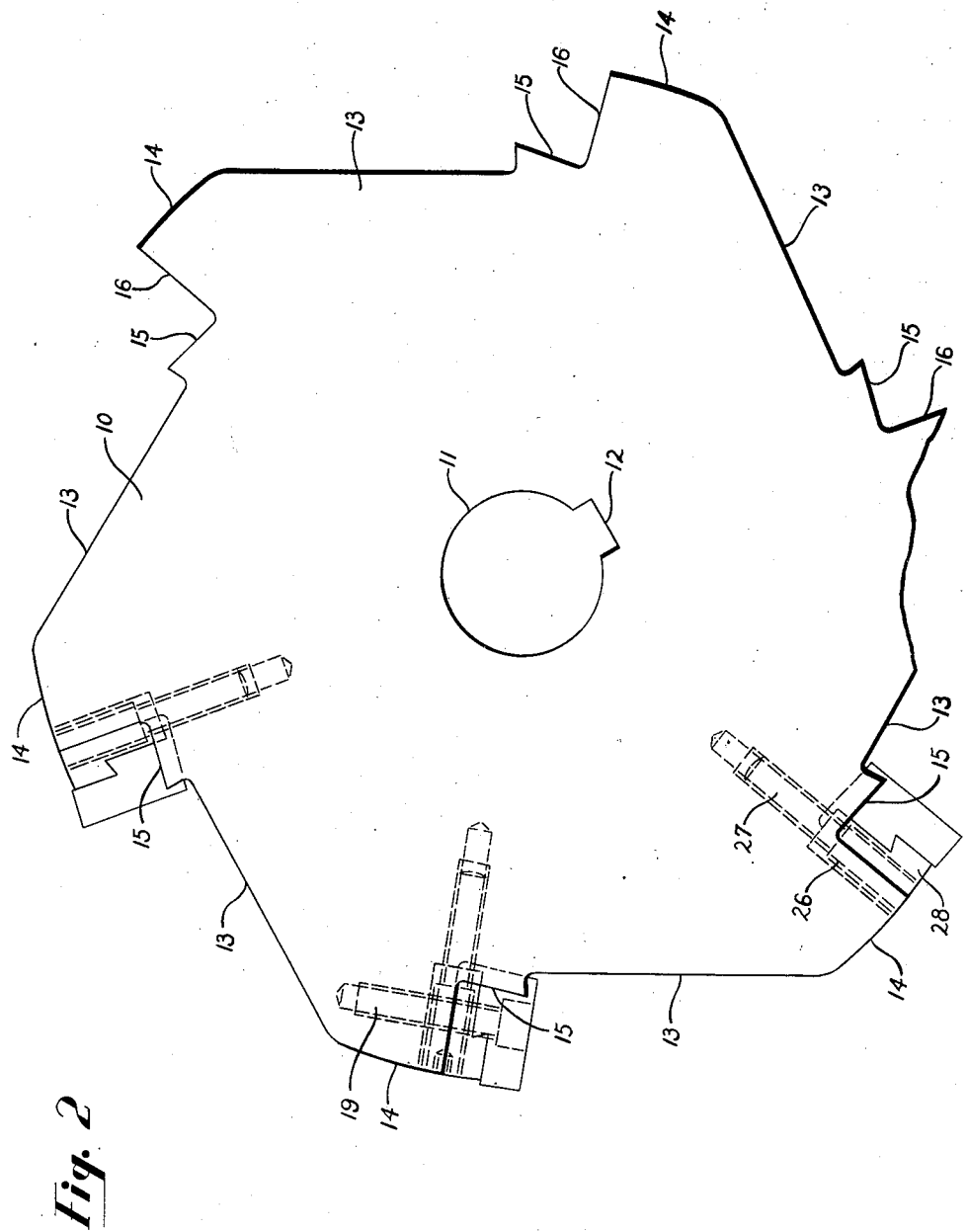

Further objects and features of the present invention and the manner by which such objects and features are attained will be apparent from a consideration of the following specification taken in conjunction with the following drawings, in which:

Fig. 1 is a side elevation of a face milling cutter embodying one form of the present inventive concept, and Fig. 2 is a face view of the cutter shown in Fig. 1.

While the inventive concept is here disclosed as applied to a face milling cutter (having only six bits for convenience of illustration) it will, of course, be understood that the inventive concept is applicable to other types of milling cutters and also to boring bars or in fact any type of holder where inserted teeth are secured in a radial relation from the center of the tool body.

In the drawings the numeral 10 indicates the tool body which is of generally circular outline having a central bore 11 and a keyway 12 by means of which the body is secured to and rotated with the arbor of a milling machine. For purposes of illustration the body is of simple solid construction, but for the bore 11 and keyway 12, however, in practice many modifications of this construction may be employed and for boring bars or the like the body is provided with a shank which is receivable in a tool holding chuck.

The periphery of the disc like body 10 is in the present case provided with six equally spaced tool seats and bit securing means. The otherwise circular peripheral surface of the body edge is cut away to provide flat approach surfaces 13 in front of each bit station while the maximum radius of the body provides backing shoulders 14 for each said station. In practice the number of stations may be materially increased over the six here shown and the peripheral contour may be greatly modified from the configuration here shown. Such features while illustrative of one embodiment are in no way intended to depict features of construction to which the practice of the invention is limited.

The backing wall of each bit station is indicated by the numeral 15 and is angularly disposed at slightly less than a right angle in transverse section, with respect to radially disposed and axially slanting bit seats 16. The plane of the wall 15 inclines in two directions. A—towards the axis of the body 10 in an axial direction and B—inwardly towards the axis in a transverse plane. The surface 16 while being radial is inclined towards the axis in an axial direction and is provided as at 17 on a portion of its surface with serrations. The serrations of the surface 16 are adapted to cooperate with like serrations on the under face of a bit securing block 18 which is mounted for transverse (or axial) adjustment across the face of the seat 16. Such adjustment is available by loosening of the block securing bolt 19 which is threaded into the face 16 and extends through the elongated hole 20 in the block 18.

The radially outward wall 21 of the block 18 and the outward rear wall 22 are preferably plane and right angularly related both being normal to the axis and transverse plane of the body, that is their outline generally conforms to the outline of the body taken at the shoulder 14.

The forward inner or bit engaging face 23 of the block 18, however, lies in a transverse plane which is tipped inwardly towards the rear face of the body so that its outwardly facing top surface extends beyond the inner serrated surface thus to overlie the side of the bit with which it contacts.

The inner longitudinal edge or back wall engaging surface 24 of the block 18 may be formed to cooperate with the double inclinations of the back wall 15, however, this is not required since the function of the block is primarily to hold down the bit by its overlapping relation and to resist axial thrust of the bit through its serrated engagement on the surface 15.

The bit 25 is secured in position by a headed bit clamp, the shank 26 of which extends radially inward through the shoulder 14 being secured by a face lock bolt 27. The head 28 of the clamp has normal radially and forward faces, its inner face 29, however, is inclined in two directions both opposite to the inclination of the surface 15 to form in both transverse and axial section dovetailed spaces. Similarly the radial inner face of the head may conform to the inclination of the face 23 of the plate 18, but since coaction therebetween is not required, the surface may be normal.

The bit 25 is formed as herein before stated in accordance with the teachings of my copending application case E. The bit comprises a block of metal preferably tipped to provide a radial cutting edge 30 and a face cutting edge 31 which may be plane and right angularly disposed or contoured as required by the specific operation being performed. While the bit is of general parallelogram construction, its inner radial surface is tilted to conform with the inclination of the surface 23 of the plate 18 under which it lies. Similarly its inner face 32 which bears against the surface 15 is doubly inclined with the surface 15 so that the inner edge of the bit is tucked in under the lip like surface 15.

The inner or concealed under surface of the bit is recessed to receive the head 28 of the bit clamp and the outwardly facing surface of the recess is inclined in both directions to match the herein before described inclinations of the inner face of the head.

From a consideration of the foregoing, it will be seen that the arrangement provides for a positive locking of the various bits in properly adjusted position with the body of the mill.

It will be seen that by virtue of the combined slopes of the seat, the bit and the lock transversely of the bit body, the holding forces and the cutting thrusts will have resultant forces directed back towards the axis and to the mass of the holder body and it will also be seen that the overlying relation of the plate and the seating surface not only act to hold down the bit, but also to redirect the cutting forces into the mass of the body.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention, and, therefore, such adaptations should be, and are intended to be, comprehended within the meaning and range of equivalency of the following claims.

What I claim is:

1. A rotary cutter having a body in the general form of a disc rotatable about an axis normal to the side faces of said body, the periphery of said body having a plurality of bit stations thereon each including a shoulder presenting a radially extending bit seating surface inclined transversely of the body and with respect to the side faces of the body, said bit stations each further presenting a radially facing backing wall surface positioned substantially at right angles to said bit seating surface and inclined transversely of the body and with respect to the side faces of the body, a securing block located at each bit station, means for holding said securing blocks in engagement with said bit seating surfaces, a tool bit located at each of said bit stations and having a face thereof abutting said securing block, said bits each having another face thereof conforming to and engaging the backing wall surface of said bit station, a bit clamp positioned adjacent each bit seating surface, means for urging said bit clamp toward said backing wall surface, and complementary engaging surfaces on said bit clamp and tool bit inclined oppositely to said backing wall surface and cooperating therewith to present a dovetail form in a cross section taken parallel to the side faces of said body, said complementary surfaces diverging toward said bit seating surface.

2. A rotary cutter as defined in claim 1 wherein said tool bit has the general form of a parallelogram in radial cross section and presents a cutting edge projecting beyond the periphery of said body.

3. A rotary cutter as defined in claim 1 in which the tool bit has the general form of a parallelogram in radial cross section and presents a cutting edge projecting beyond one side face of the body.

4. A rotary cutter as defined in claim 1 wherein the tool bit has the general form of a parallelogram in radial cross section and has two adjacent walls thereof presenting cutting edges, one of which projects beyond the periphery of the cutter body, and the other of which projects beyond the side face of the cutter body, said dovetails converging toward said cutting edges.

HENRY M. SHERIDAN.

REFERENCES CITED

The following references are of record in the file of this patent:

UNITED STATES PATENTS

| Number | Name | Date |
|---|---|---|
| 713,001 | Grant | Nov. 4, 1902 |
| 1,898,051 | Head | Feb. 21, 1933 |

FOREIGN PATENTS

| Number | Country | Date |
|---|---|---|
| 115,648 | Germany | Nov. 19, 1899 |
| 513,333 | Great Britain | Oct. 10, 1939 |
| 589,034 | France | Feb. 14, 1925 |